United States Patent
Parisi et al.

(10) Patent No.: US 7,785,054 B2
(45) Date of Patent: Aug. 31, 2010

(54) FASTENING ASSEMBLY

(75) Inventors: Brian M. Parisi, Evanston, IL (US); Anthony Pascariello, Southington, CT (US)

(73) Assignee: Illinois Tool Works Inc., Glenview, IL (US)

( * ) Notice: Subject to any disclaimer, the term of this patent is extended or adjusted under 35 U.S.C. 154(b) by 60 days.

(21) Appl. No.: 11/940,810

(22) Filed: Nov. 15, 2007

(65) Prior Publication Data

US 2008/0226418 A1 Sep. 18, 2008

Related U.S. Application Data

(60) Provisional application No. 60/918,007, filed on Mar. 14, 2007.

(51) Int. Cl.
F16B 21/00 (2006.01)

(52) U.S. Cl. ............... 411/338; 411/533; 296/41.4

(58) Field of Classification Search ............ 411/338, 411/339, 533; 296/35.1; 267/141.4; 248/635
See application file for complete search history.

(56) References Cited

U.S. PATENT DOCUMENTS

| | | | |
|---|---|---|---|
| 3,193,237 A | | 7/1965 | Adams |
| 3,218,101 A | | 11/1965 | Adams |
| 3,622,194 A | | 11/1971 | Bryk |
| 4,720,075 A | | 1/1988 | Peterson et al. |
| 4,783,039 A | | 11/1988 | Peterson et al. |
| 4,921,203 A | | 5/1990 | Peterson et al. |
| 5,170,985 A | | 12/1992 | Killworth et al. |
| 5,178,433 A | | 1/1993 | Wagner |
| RE35,123 E | | 12/1995 | Wagner |
| 5,570,867 A | * | 11/1996 | Norkus ............ 248/635 |
| 5,599,148 A | * | 2/1997 | Hirose ............ 411/175 |
| 6,022,903 A | * | 2/2000 | Younes et al. ............ 521/133 |
| 6,095,481 A | | 8/2000 | Norkus et al. |
| 6,139,443 A | * | 10/2000 | Reynolds ............ 473/278 |
| 6,183,182 B1 | * | 2/2001 | Baumgartner ............ 411/533 |
| 6,227,783 B1 | * | 5/2001 | Salameh ............ 411/353 |
| 6,309,157 B1 | * | 10/2001 | Amann et al. ............ 411/353 |

(Continued)

FOREIGN PATENT DOCUMENTS

KR 3042923 A 6/2003

OTHER PUBLICATIONS

International Search Report and Written Opinion for PCT/US08/53850.

*Primary Examiner*—Gary Estremsky
(74) *Attorney, Agent, or Firm*—Mark W. Croll; Paul F. Donovan

(57) ABSTRACT

A fastening system is configured to secure a first panel to a second panel while isolating the first panel from the second panel. The fastening system may include a first retainer, a sleeve, and a fastener. The first retainer may include a planar sheet and a central opening. The sleeve includes a plurality of inwardly-canted tabs, wherein a central channel is formed through the sleeve. The sleeve is secured within the central opening of the planar sheet. The fastener is positioned within the central channel of the sleeve and the inwardly-canted tabs securely engage the fastener to prevent the fastener from retreating within the sleeve. The fastening system may also include a second retainer, wherein a portion of the sleeve snapably secures to a portion of the second retainer.

17 Claims, 5 Drawing Sheets

U.S. PATENT DOCUMENTS

| | | | |
|---|---|---|---|
| 6,523,817 B1 * | 2/2003 | Landry, Jr. | 267/141.4 |
| 6,910,671 B1 * | 6/2005 | Norkus et al. | 248/635 |
| 7,163,200 B2 | 1/2007 | Dickson et al. | |
| 2004/0197136 A1 | 10/2004 | Emin | |
| 2005/0073166 A1 | 4/2005 | Snyder | |

* cited by examiner

FASTENING ASSEMBLY

RELATED APPLICATIONS

This application relates to and claims priority benefits from U.S. Provisional Patent Application No. 60/918,007 entitled "Fastening Assembly," filed Mar. 14, 2007, which is hereby incorporated by reference in its entirety.

FIELD OF THE INVENTION

Embodiments of the present invention generally relate to a fastening system, and more particularly to a system that provides a fastener, such as a bolt, preassembled to a mounting member.

BACKGROUND OF THE INVENTION

In various applications, one structural component is securely fastened to, but isolated from, another structural component through fasteners. For example, an operational component of a vehicle, such as an engine, may be secured to a vehicle frame through a fastening system that isolates the component from the vehicle frame.

FIG. 1 illustrates a cross-sectional view of a conventional fastening system 10. The fastening system 10 includes a bolt 12 positioned within a lower retainer 14. The lower retainer 14 includes a tube 16 into which the bolt 12 passes. The tube 16 is, in turn, positioned within a larger tube 18 of an upper retainer 20. The fastening system 10 is then used to secure a vehicle body or component 22 to a vehicle chassis or frame 24, while isolating the body 22 from the frame 24.

A first microcellular polyurethane (MCU) member 26 is compressively sandwiched between a top surface of the vehicle frame 24 and the upper retainer 20, while a second MCU member 28 is compressively sandwiched between a lower surface of the vehicle frame 24 and the lower retainer 14. A cage nut 30 positioned over the vehicle body 22 axially secures the bolt 12 in position.

FIG. 2 illustrates a cross-sectional view of the conventional upper retainer 20. As shown in FIG. 2, a separate and distinct metal retaining clip 32 may be positioned within the tube 18 of the upper retainer 20 in order to ensure that the lower retainer 14 is properly secured and aligned with respect to the upper retainer 20. That is, the retaining clip 32 secures to a distal end of the tube 16 of the lower retainer 14.

Referring again to FIG. 1, during an assembly process, the bolt 12 is slid through the lower and upper retainers 14 and 20 into the cage nut 30. Once the bolt 12 is positioned within the cage nut 30, the cage nut 30 and/or the bolt 12 are typically finger tightened. Later, the bolt 12 is torqued to a specified value.

In general, however, the process of positioning the bolt 12, finger tightening, and then later using a separate tool to torque the bolt is time-consuming. Additionally, the bolt 12 may shift and move within the tubes 16 and 18. As such, the bolt 12 may be misaligned within the fastening system 10.

SUMMARY OF THE INVENTION

Embodiments of the present invention provide a more efficient system and method of securing one component, such as a vehicle component or body, to a second component, such as a vehicle frame.

Certain embodiments of the present invention provide a fastening system configured to secure a first panel to a second panel while isolating the first panel from the second panel. The fastening system may include a first retainer and a sleeve.

The first retainer may include a central tube defining a central passage. The central tube may include at least one protuberance, such as a ramp, extending into the central passage.

The sleeve is configured to retain a fastener and may be positioned with the first retainer. The sleeve may include at least one ledge configured to securely engage the at least one protuberance to secure the sleeve to the first retainer. The sleeve may include a base integrally connected to a distal end through an intermediate portion, wherein the at least one ledge is proximate a union of the distal end and the intermediate portion.

The fastening system may also include a second retainer. A portion of the sleeve may be secured to the second retainer. As such, the sleeve may secure the first retainer to the second retainer.

The sleeve may also include inwardly-canted tabs configured to securely retain the fastener. The inwardly-canted tabs prevent the fastener from retreating within the sleeve.

The fastening system may also include at least one microcellular polyurethane (MCU) member proximate the first retainer and the sleeve. The MCU member dampens vibrations that may be transmitted into the fastening system.

Certain embodiments of the present invention provide a fastening system that includes a first retainer having a planar sheet and a central opening, a sleeve and a fastener. The sleeve may include a plurality of inwardly-canted tabs, wherein a central channel is formed through the sleeve. The sleeve may be secured within the central opening of the planar sheet. The fastener may be positioned within the central channel of the sleeve. The inwardly-canted tabs securely engage the fastener to prevent the fastener from retreating within the sleeve. The system may also include a second retainer, wherein a portion of the sleeve snapably secures to a portion of the second retainer.

Certain embodiments of the present invention provide a fastening system that includes first and second retainers, a sleeve and a fastener. The first retainer may include a tube defining a passage, wherein the tube includes at least one protuberance extending into the passage. The second retainer may include a planar sheet and an opening formed within the planar sheet.

The sleeve may be positioned within the first retainer and may include (i) at least one ledge configured to securely engage the at least one protuberance to secure the sleeve to the first retainer, and (ii) a plurality of inwardly-canted tabs, wherein a longitudinal channel is formed through the sleeve. The sleeve may also be secured within the opening of the planar sheet.

The fastener may be positioned within the channel of the sleeve. The inwardly-canted tabs securely engage the fastener to prevent the fastener from retreating within the sleeve.

Figure 1:
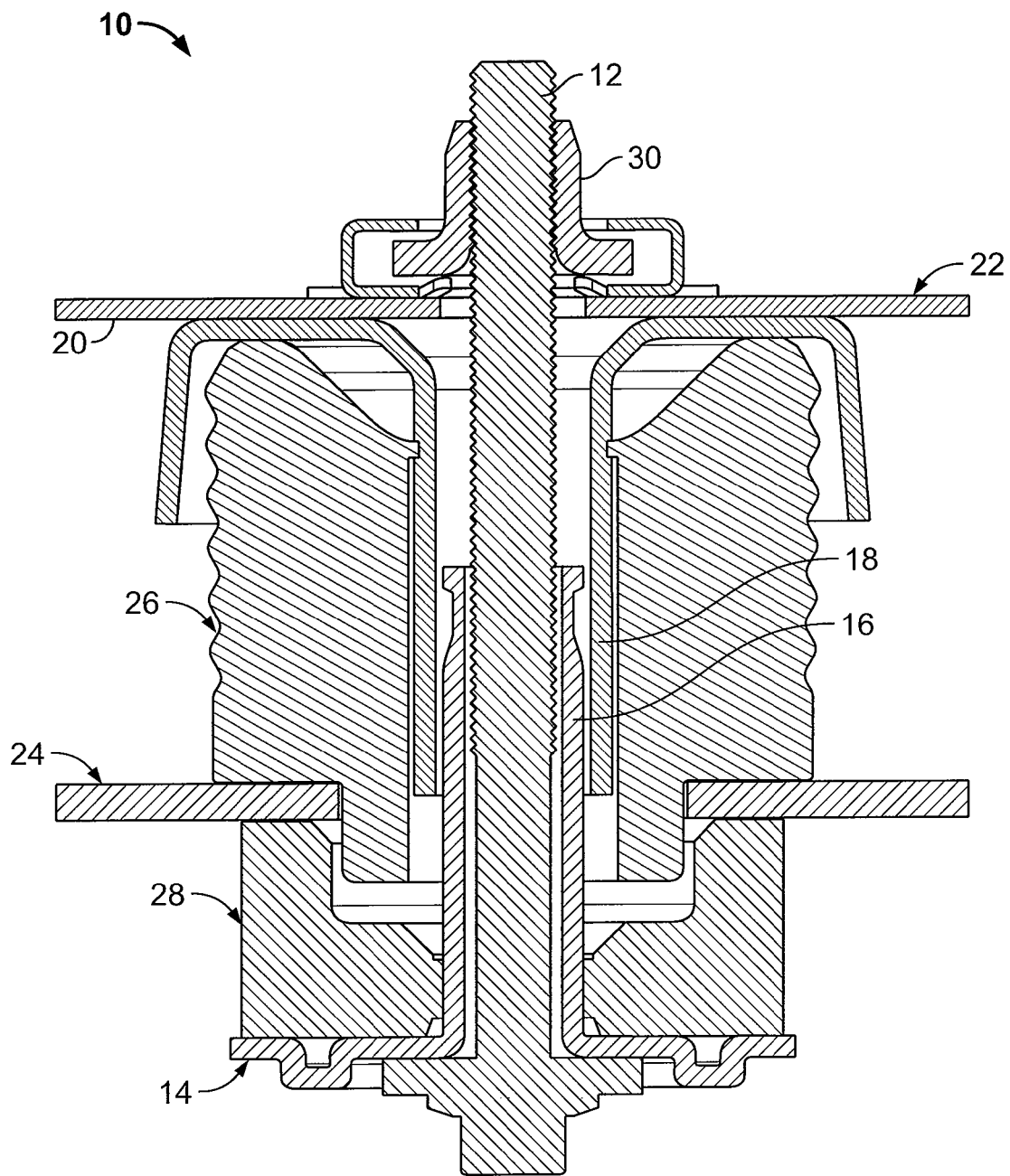
FIG. 1 illustrates a cross-sectional view of a conventional fastening system.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 3:
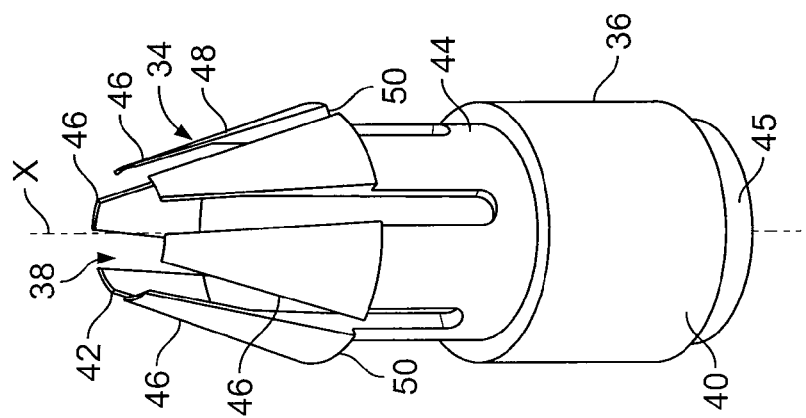
FIG. 3 illustrates an isometric view of a retaining sleeve according to an embodiment of the present invention.
Figure 2:
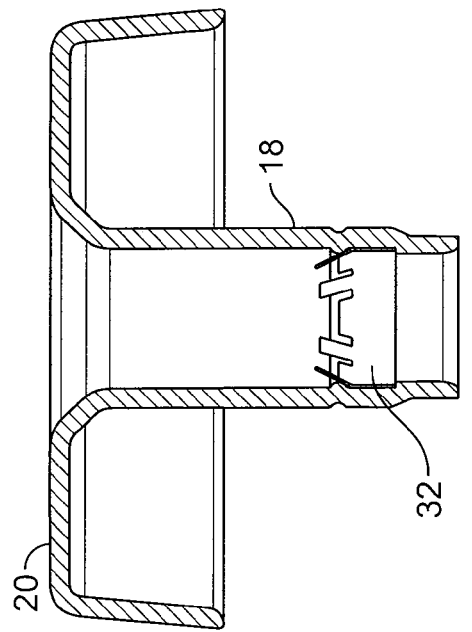
FIG. 2 illustrates a cross-sectional view of a conventional upper retainer.

FIG. 3 illustrates an isometric view of a retaining sleeve 34 according to an embodiment of the present invention. The retaining sleeve 34 includes a main tubular body 36 that may be formed of plastic. A central channel, passage or the like 38 passes over a length of the sleeve 34 from a base 40 to a distal end 42 of the sleeve 34.

The base 40 is integrally connected to the distal end 42 through a recessed intermediate portion 44. The base 40 may include a recessed lower portion 45 having a smaller outer circumference than the remainder of the base 40. The recessed lower portion 45 of the base 45 is configured to secure within an opening of a retainer through an interference fit, for example.

A plurality of inwardly-canted retaining tabs 46 are located at the distal end 42 of the sleeve 34. The inwardly-canted retaining tabs 46 have ramped surfaces 48 that taper toward the central axis x of the sleeve 34 from the area proximate the intermediate portion 44 to the distal end 42. That is, the retaining tabs 46 taper down with increased distance from the intermediate portion 44. Retaining ledges 50, clasps, barbs, or other such protuberances are formed proximate the interface of the retaining tabs 46 and the intermediate portion 44.

Figure 4:
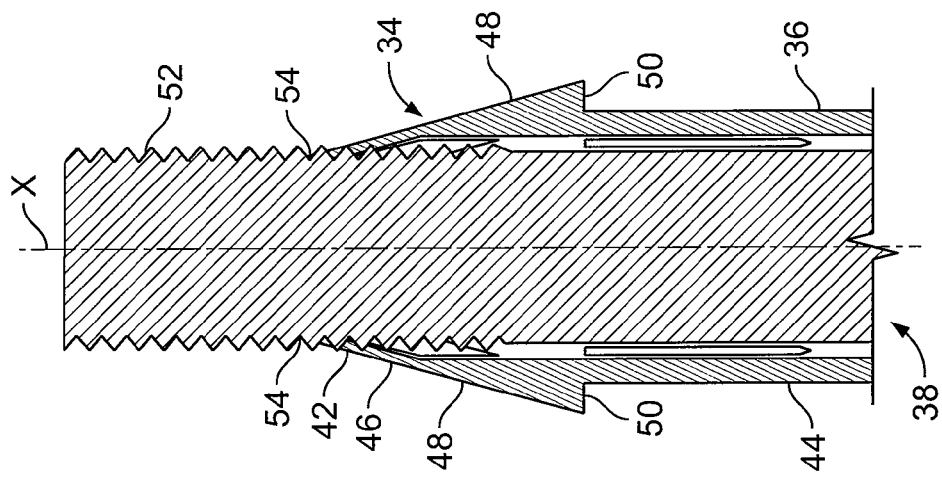
FIG. 4 illustrates a cross-sectional view of a retaining sleeve retaining a bolt according to an embodiment of the present invention.

FIG. 4 illustrates a cross-sectional view of the retaining sleeve 34 retaining a bolt 52 according to an embodiment of the present invention. The bolt 52 passes into the central channel 38 of the retaining sleeve 34 through the base 40 (shown in FIG. 1) and into the intermediate portion 44 and the distal end 42. As the bolt 52 passes into the distal end 42, the inwardly-canted retaining tabs 46 abut into the outer surfaces of the bolt 52. In particular, the retaining tabs 46 may wedge into or between threads 54 of the bolt 52. The tapered nature of the ramped surfaces 48 of the retaining tabs 46 ensures that distal ends of the retaining tabs 46 abut into the bolt 52, thereby compressively sandwiching the bolt 52 between the plurality of retaining tabs 46. The retaining tabs 46 compressively secure the bolt in a secured and aligned positioned about the central axis x of the retaining sleeve 34. The bolt 52 is prevented from retreating back through the retaining sleeve 34. Thus, the bolt 52 is secured in place with respect to the retaining sleeve 34.

Figure 5:
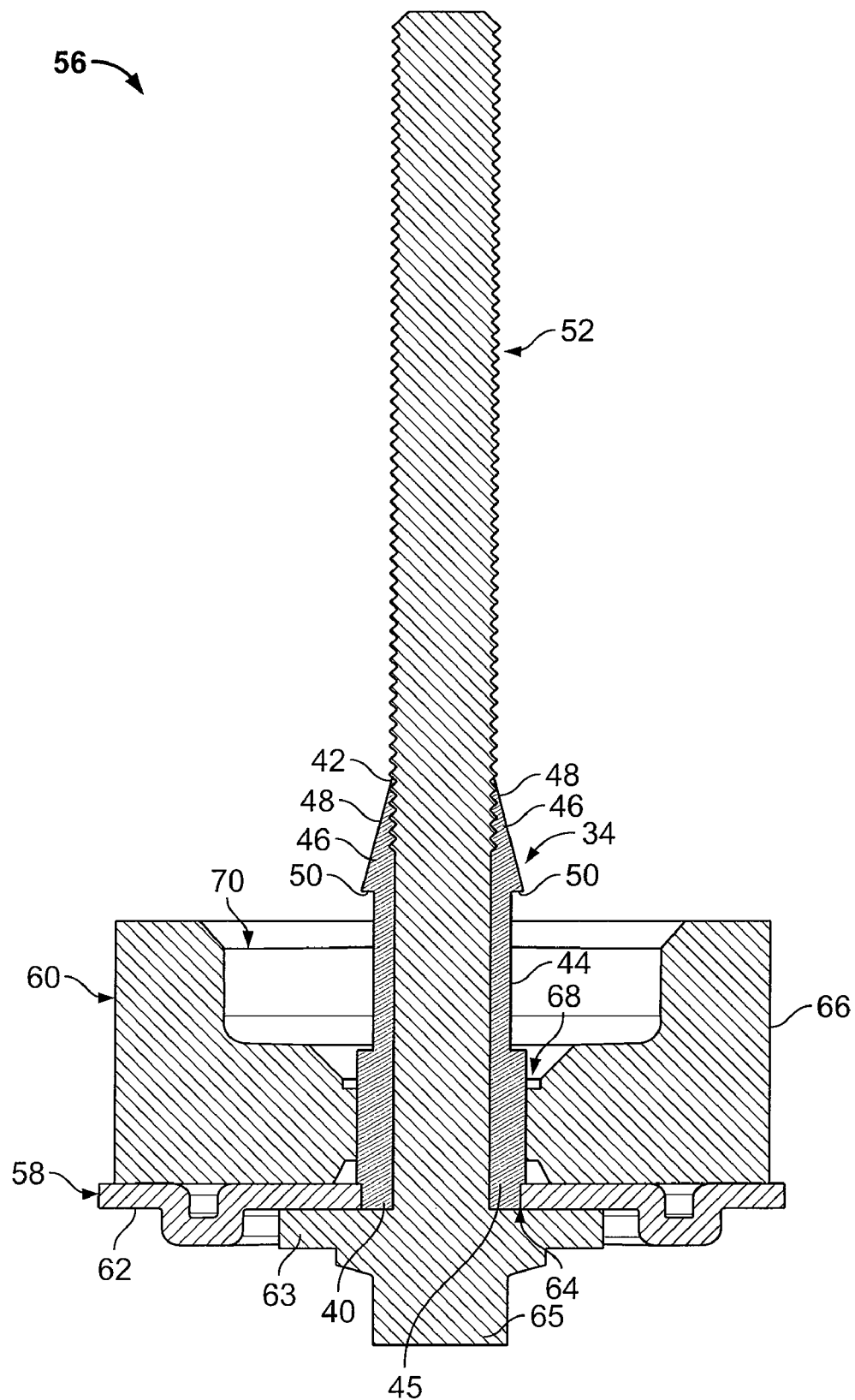
FIG. 5 illustrates a cross-sectional view of a first retaining assembly according to an embodiment of the present invention.

FIG. 5 illustrates a cross-sectional view of a first or lower retaining assembly 56 according to an embodiment of the present invention. The term "lower," along with other terms of orientation in the present application, are merely used with respect to the orientations shown in the drawings. It is understood that the orientation of FIG. 5 may be inverted such that the retaining assembly 56 is an "upper" retaining assembly.

The lower retaining assembly 56 includes the bolt 52 secured within the retaining sleeve 34. Additionally, the retaining assembly 56 includes a lower retainer 58 and a microcellular polyurethane (MCU) member 60.

The lower retainer 58 includes a generally circular panel 62 or sheet having a central opening 64. The base 40 of the retaining sleeve 40 is secured within the central opening 40. That is, the base 40 may be removably secured, such as through a snap-fit, or may be permanently secured to the lower retainer 58 through bonding, or the like. As shown in FIG. 5, a washer 63 may be positioned between the bolt head 65 and a lower surface of the panel 62.

During the assembly process, the retaining sleeve 34 may be secured to the lower retainer 48 prior to the bolt 52 being positioned within the retaining sleeve 34. Optionally, the bolt 52 may be positioned within the retaining sleeve 34, which is then secured to the lower retainer 48.

The MCU member 60 includes a generally cylindrical main body 66 having a central passage 68 connected to an expanded open area 70. The MCU member 60 is positioned around the retaining sleeve 34. That is, the central sleeve 34 is positioned through the central passage 68. The MCU member 60 may press-fit into the central sleeve 34 proximate the base 40. As shown in FIG. 5, the intermediate portion 44 and the retaining tabs 46 generally do not contact the MCU member 60.

The MCU member 60 is supported by the panel 62 of the lower retainer 58. The MCU member 60 is configured to absorb vibrations. In short, the MCU member 60 acts as a dampening agent. The MCU member 60 may be secured over the lower retainer 58 through the retaining sleeve 34 and/or features of the lower retainer 58. For example, the MCU member 60 may include features that snap into reciprocal features formed on or in the lower retainer 58 and/or the retaining sleeve 34. Additionally, the ledges 50 of the retaining sleeve 34 may provide a barrier past which the MCU member 60 may not pass. That is, the ledges 50 may abut into areas of the MCU member 60 that define the central passage 68 if the MCU member 60 upwardly shifts.

Figure 6:
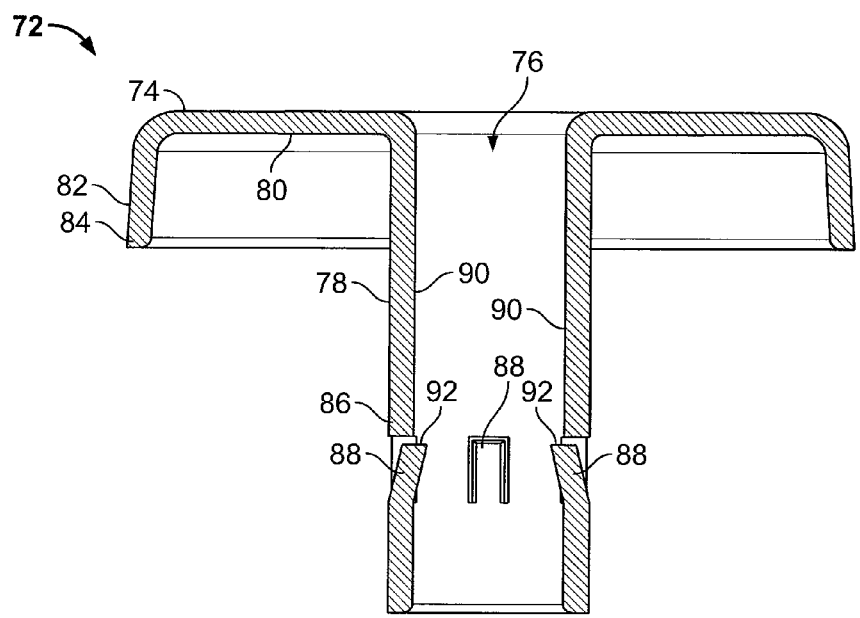
FIG. 6 illustrates a cross-sectional view of an upper retainer according to an embodiment of the present invention.

FIG. 6 illustrates a cross-sectional view of an upper retainer 72 according to an embodiment of the present invention. Again, the term "upper" is merely used with respect to the orientation shown in the Figures. The upper retainer 72 includes a planar base 74 having a central passage, channel or the like 76 defined by a tube 78 that extends from a lower surface 80 of the planar base 74. The base 74 is also integrally connected to outer circumferential walls 82 that also extend from the lower surface 80. A cap 84 is defined between the base 74, the outer circumferential walls 82 and an outer surface 86 of the tube 78.

Ramps 88, clasps, barbs, or other such protuberances extend inwardly into the central passage 76 from interior surfaces 90 of the tube 78. As shown in FIG. 6, the ramps 88 are generally coplanar and include sleeve-retaining ledges 92.

The upper retainer 72 may include more or less ramps 88 than those shown. Instead of a plurality of ramps 88, a contiguous ramped ledge may extend over an entire inner circumference of the tube 78. The contiguous ledge may be more robust than the individual ramps, which may, however, provide more flexibility.

Figure 7:
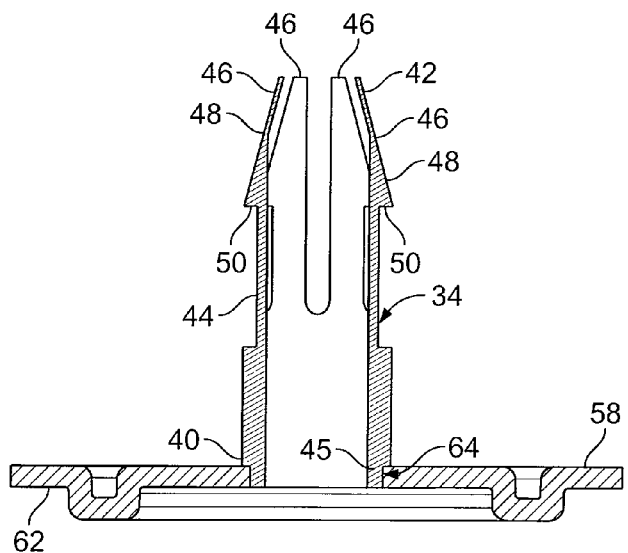
FIG. 7 illustrates a cross-sectional view of a lower retainer secured to a retaining sleeve according to an embodiment of the present invention.

FIG. 7 illustrates a cross-sectional view of the lower retainer 58 secured to the retaining sleeve 34. As discussed above with respect to FIG. 5, the base 40 of the retaining sleeve 34 is secured within the central opening 64 of the panel or sheet 62 of the lower retainer 58. The retaining ledges 50 of the retaining tabs 46 are configured to snapably engage the sleeve-retaining ledges 92 (shown in FIG. 6) of the upper retainer 72 (shown in FIG. 6) in order to align and secure the retaining sleeve 34, and therefore the lower retainer 58, with respect to the upper retainer 72.

The retaining sleeve 34 may include more or less retaining tabs 46 than those shown. For example, the retaining sleeve 34 may include a contiguous beveled nose or tip that extends over a circumference of the distal end 42. However, a plurality of separate and distinct retaining tabs 46 may provide more flexibility than a rigid beveled nose, which may be more robust than individual tabs.

Figure 8:
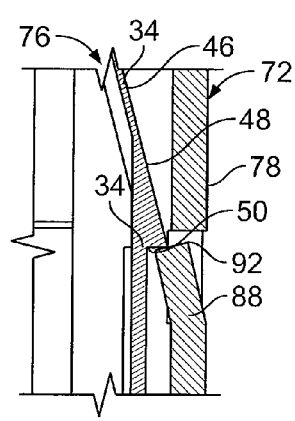
FIG. 8 illustrates a cross-sectional view of a retaining sleeve secured to an upper retainer according to an embodiment of the present invention.

FIG. 8 illustrates a cross-sectional view of the retaining sleeve 34 secured to the upper retainer 72 according to an embodiment of the present invention. When the retaining sleeve 34 is urged into the central passage 76 of the tube 78 of the upper retainer 72, the ramped surfaces 48 of the retaining tabs 46 slide over the ramps 88 within the tube 78 until the retaining ledges 50 snapably engage the sleeve-retaining ledges 92. As such, the retaining sleeve 34 is snapably secured to the upper retainer 72. As shown in FIG. 8, the ledges 50 are supported on the ledges 92, thereby ensuring that the retaining sleeve 34 (and the lower retaining assembly 56) is secured to the upper retainer 72.

Figure 9:
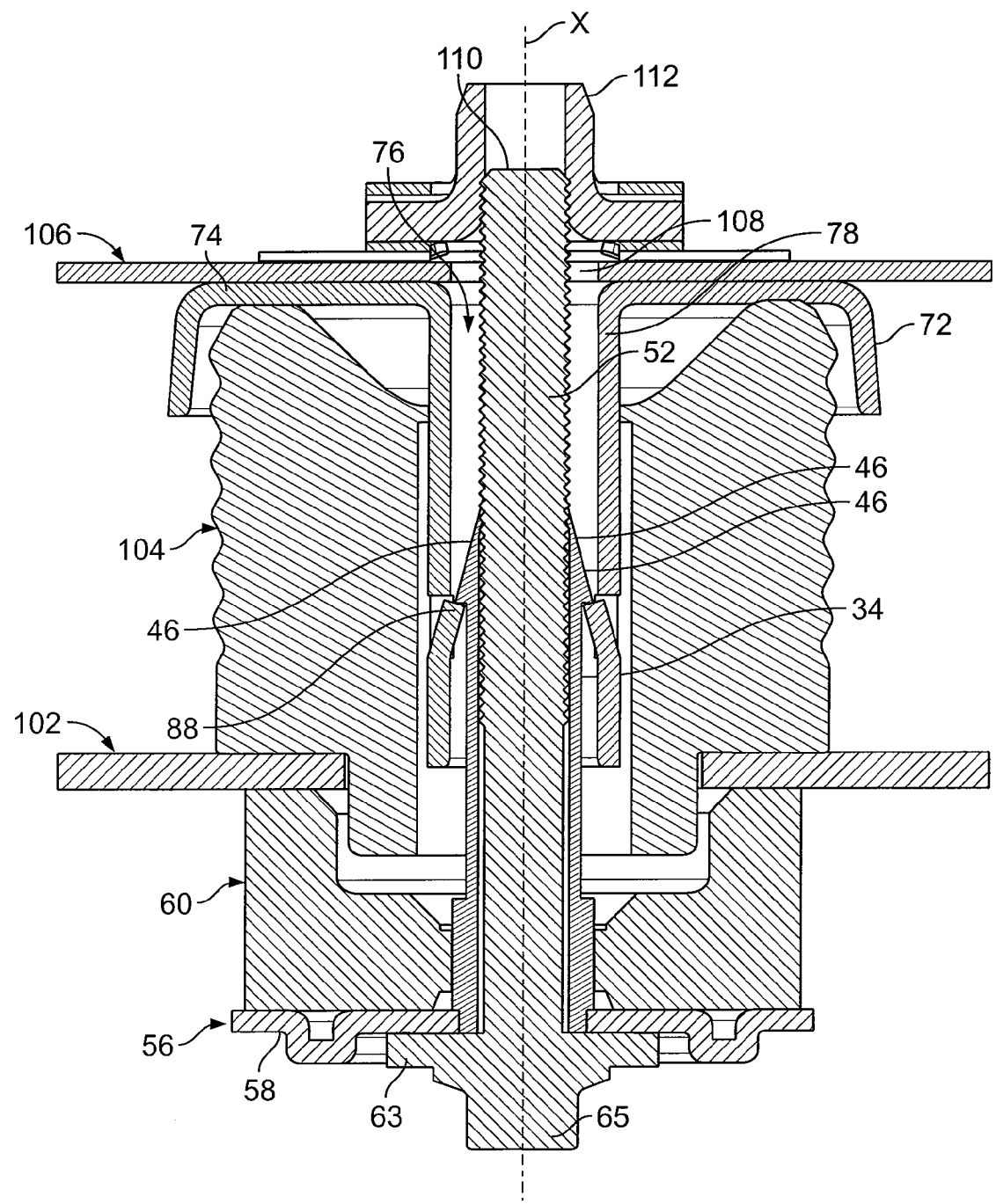
FIG. 9 illustrates a cross-sectional view of a fastening system according to an embodiment of the present invention.

FIG. 9 illustrates a cross-sectional view of a fastening system 100 according to an embodiment of the present invention. The fastening system 100 includes the lower retaining assembly 56 secured to the upper retainer 72. A panel 102, such as a vehicle frame, is positioned between the MCU member 60 and another MCU member 104 that is positioned underneath the base 74 and around the tube 78 of the upper retainer 72. A second panel 106, such as a vehicle body or component, is positioned over the base 74. An opening 108 is formed through the second panel 60. The central passage 76 of the tube 78 is aligned with the opening 108. A distal end 110 of the bolt 52 passes through the opening 108, and a cage nut 112 may be tightened around the distal end 110 to secure the isolated panels 102 and 106 together. The MCU members 60 and 104 absorb vibratory energy between the panels 102 and 106.

As discussed above, the central sleeve 34 is securely aligned in position within the tube 78 by way of the retaining tabs 46 securely engaging the ramps 88. Thus, the lower retaining assembly is securely aligned and positioned with respect to the upper retainer 72. Additionally, the inwardly-canted tabs 46 securely retain and align the bolt 52 about the central axis of the system 100, as discussed above with respect to FIG. 4.

In general, the retaining sleeve 34 allows the bolt 52 to be pre-assembled to the lower retaining assembly 56 when delivered to a customer. As such, there is no need to insert the bolt into the lower retaining assembly 56 (in stark contrast to the conventional fastening system 10). Instead, the retaining tabs 46 of the retaining sleeve 34 securely retain the bolt 52 within the lower retaining assembly 56. An operator need only torque the cage nut 112 to secure the fastening system 100. There is no need, therefore, for an operator to insert a bolt into an assembly, finger tighten the bolt with respect to a cage nut and hold the bolt in place for another operator to torque. Thus, the assembly process is much simpler and more efficient as compared to prior assemblies.

Embodiments of the present invention provide a system and method that includes a retaining sleeve that holds the fastening assembly and fastener together. The retaining sleeve, as discussed above, includes at least one ramp, edge, barb, clasp or the like that snapably secures over reciprocal features formed in an upper retainer. Further, the inwardly-canted tabs of the retaining sleeve securely position and align a bolt so that the bolt does not retreat within the retaining sleeve.

Embodiments of the present invention provide a system in which the fastener may be preassembled to a lower retaining assembly. The conventional manufacturing step of installing the fastener within the retainers and then finger tightening the fastener with respect to the cage nut is eliminated. Thus, embodiments of the present invention provide an efficient system and method of manufacturing and installing a fastening system that is used to secure panels together, while isolating the panels from one another.

While various spatial and directional terms, such as upper, bottom, lower, mid, lateral, horizontal, vertical, and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A fastening system configured to secure a first panel to a second panel while isolating the first panel from the second panel, the fastening system comprising:
a fastener;
a first retainer having a central tube defining a central passage, wherein said central tube comprises at least one protuberance extending into said central passage; and
a sleeve having a base and a distal end with a passage extending through said base and said distal end, said sleeve engaged to said fastener so as to retain said fastener wherein a portion of said sleeve wedges between threads of the fastener, said sleeve being positioned with said first retainer, said sleeve comprising at least one ledge configured to snapably engage said at least one protuberance to secure said sleeve to said first retainer, wherein said sleeve is formed of plastic.

2. The fastening system of claim 1, further comprising a second retainer, wherein a portion of said sleeve is secured to said second retainer.

3. The fastening system of claim 2, wherein said sleeve secures said first retainer to said second retainer.

4. The fastening system of claim 1, wherein said sleeve further comprises inwardly-canted tabs configured to securely retain the fastener, wherein said inwardly-canted tabs prevent the fastener from retreating within said sleeve.

5. The fastening system of claim 1, further comprising at least one microcellular polyurethane member proximate said first retainer and said sleeve.

6. The fastening system of claim 1, wherein said at least one protuberance comprises a ramp.

7. The fastening system of claim 1, wherein said sleeve comprises a base integrally connected to a distal end through an intermediate portion, wherein said at least one ledge is proximate a union of said distal end and said intermediate portion.

8. A fastening system configured to secure a first panel to a second panel while isolating the first panel from the second panel, the fastening system comprising:
   a first retainer having a planar sheet and a central opening;
   a sleeve comprising a plurality of inwardly-canted tabs, wherein a central channel is formed through said sleeve, said sleeve being secured within said central opening of said planar sheet;
   a fastener positioned within said central channel of said sleeve, said inwardly-canted tabs at uppermost ends thereof securely positioned to engage and wedge into threads of said fastener to prevent said fastener from retreating within said sleeve; and
   a second retainer, wherein a portion of said sleeve snapably secures to a portion of said second retainer.

9. The fastening system of claim 8, wherein said sleeve secures said first retainer to said second retainer.

10. The fastening system of claim 8, further comprising at least one microcellular polyurethane member positioned on said planar sheet.

11. The fastening system of claim 8, wherein said sleeve comprises a base integrally connected to a distal end through an intermediate portion, wherein said inwardly-canted tabs are proximate said distal end.

12. The fastening system of claim 8, wherein said sleeve is formed of plastic.

13. A fastening system configured to secure a first panel to a second panel while isolating the first panel from the second panel, the fastening system comprising:
   a first retainer having a tube defining a passage, wherein said tube comprises at least one protuberance extending into said passage;
   a second retainer having a planar sheet and an opening formed within said planar sheet;
   a sleeve positioned with said first retainer, said sleeve comprising at least one ledge configured to securely engage said at least one protuberance to secure said sleeve to said first retainer, and a plurality of inwardly-canted tabs, wherein a longitudinal channel is formed through said sleeve, said sleeve being secured within said opening of said planar sheet, and wherein said sleeve comprises a base integrally connected to a distal portion through an intermediate portion, said at least one ledge being proximate a union of said distal portion and said intermediate portion, such that said plurality of inwardly-canted tabs are proximate said distal portion, said inwardly-canted tabs having ramped surfaces that continuously taper toward a central axis extending through said channel from an area proximate said intermediate portion to distal most ends of said distal portion; and
   a fastener positioned within said channel of said sleeve, said inwardly-canted tabs wedged between threads of said fastener to prevent said fastener from retreating within said sleeve.

14. The fastening system of claim 13, wherein said sleeve secures said first retainer to said second retainer.

15. The fastening system of claim 13, further comprising at least one microcellular polyurethane item positioned between said first and second retainers.

16. The fastening system of claim 13, wherein said at least one protuberance comprises a ramp.

17. The fastening system of claim 13, wherein said sleeve is formed of plastic.

* * * * *